Nov. 29, 1938.  B. PUTTERMAN ET AL  2,138,808
MIRROR DEVICE
Filed Oct. 13, 1937
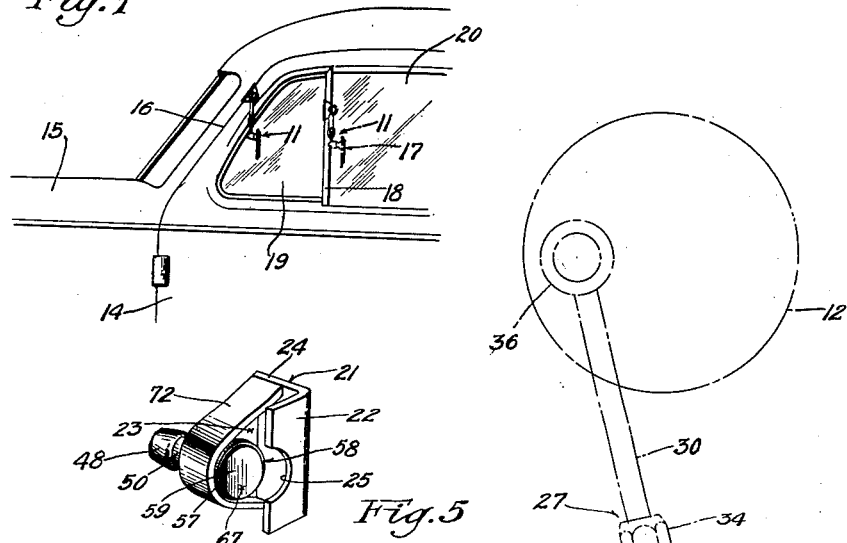
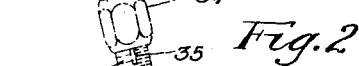
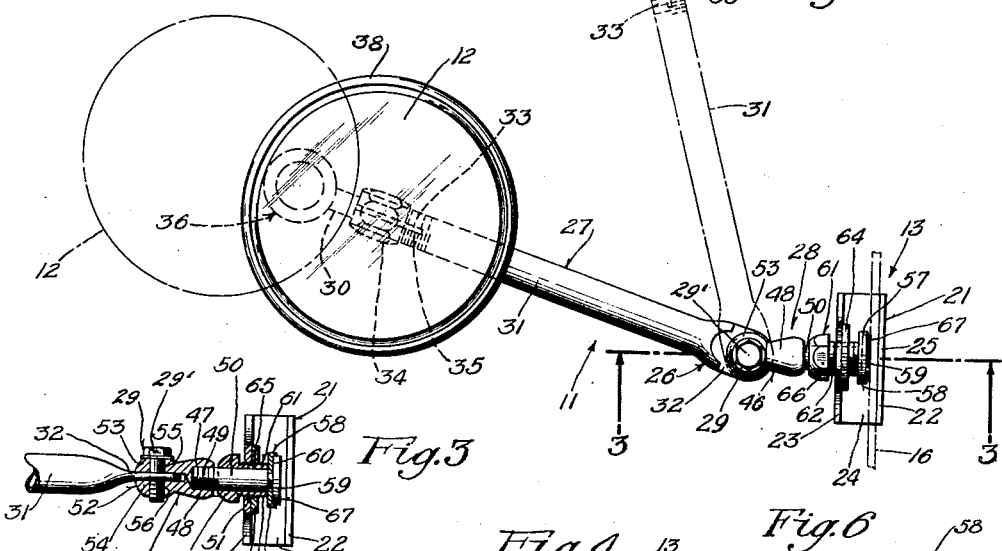
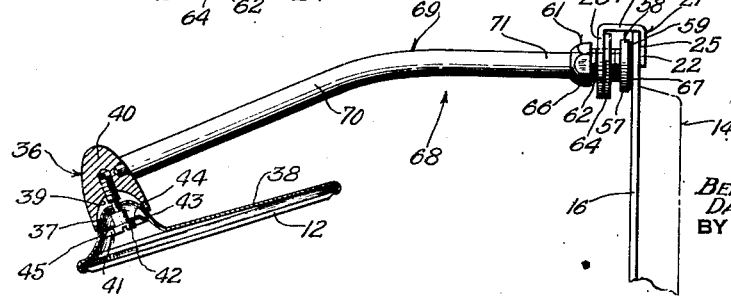
INVENTOR
BENJAMIN PUTTERMAN
DANIEL E. REED
BY William T. Heyrer
ATTORNEY Patented Nov. 29, 1938

2,138,808

UNITED STATES PATENT OFFICE 2,138,808

MIRROR DEVICE

Benjamin Putterman, Brooklyn, N. Y., and Daniel E. Reed, Norwalk, Conn., assignors to Yankee Metal Products Corp., Norwalk, Conn., a corporation of New York Application October 13, 1937, Serial No. 168,688

4 Claims. (Cl. 248—286)

This invention relates to a mirror device, and more particularly to an improved means for mounting a rear view mirror on a vehicle.

It is an object of the invention to provide a mirror device which may be readily clamped onto a part of a vehicle, and particularly to the flange of an automobile door.

It is a further object of the invention to provide such a device in which the clamping means is not only simple in construction and operation but which is sightly so it will not detract from the appearance of the vehicle.

A feature of the invention, therefore, resides in providing a mirror device in which the movable jaw of the clamping means is positioned on the end of the mirror support and in which a sleeve is rotatably mounted on the support and in screw threaded association with the clamping means for urging the movable jaw toward the fixed jaw of the clamping means.

Another feature of the invention resides in providing a mirror device of the above character in which an offset arm is employed to support the mirror and thus make possible the ready adjustment of the mirror to divers heights.

Other features of the invention consist in providing a mirror device which may be readily clamped to a motor vehicle door, as to the door flange, in which the supporting arm for the mirror is extensible and/or pivotally mounted relative to the clamping means; and in which the mirror is associated with the support by a universal pivotal connection.

Another feature of the invention resides in providing a mirror device in which the clamping means employed includes a U-shaped member having inner and outer opposed flanges, the inner flange constituting the fixed jaw, and a flange extending inwardly from the outer flange constituting a cover for overlying the movable jaw located intermediate the opposed inner and outer flanges.

Other objects and features will hereinafter appear.

In the drawing:

Figure 1 is a view showing the mirror device clamped to an automobile door.

Fig. 2 is an enlarged view showing the mirror device in operative association with the flange of an automobile door, the device being disclosed in a number of adjusted positions.

Fig. 3 is a detail view, partially in section, taken substantially on the line 3—3 in Fig. 2.

Fig. 4 is an enlarged view showing a slightly modified mirror device.

Fig. 5 is a perspective view showing a modified clamping means.

Fig. 6 is an exploded fragmentary detail view, partially in section, showing a preferred connection between the support and the movable jaw.

Before describing the present improvements and mode of operation thereof in detail it should be understood that the invention is not limited to the details of construction and arrangement of parts shown in the accompanying drawing, which is merely illustrative of the present preferred embodiments, since the invention is capable of other embodiments, and the phraseology employed is for the purpose of description and not of limitation.

Referring more particularly to the drawing and first to Figs. 1, 2 and 3 for the present preferred embodiment of the invention there is disclosed a mirror device 11 having a mirror 12 at one end thereof and having a clamping means 13 at the other end thereof to enable the ready attachment of the device, as to a door 14 of an automobile 15 shown in Fig. 1.

Because of the fact that the usual rear view mirror centrally located in the interior of an automobile and in front of the operator's seat while affording a clear view of the road directly at the rear of the automobile, fails to afford a view of the road at the rear and to the side of the automobile, there has been a growing demand for mirror devices to supplement the usual rear view mirror for the purpose of affording the operator a more complete view of the road not coming within his direct line of vision. The mirror device 11 provided by the present invention is adapted to serve most efficiently as such a supplemental rear view mirror device to enable the viewing of portions of the road not coming within the range of the usual rear view mirror positioned within the interior of the automobile.

While the mirror device 11 disclosed may be attached to portions of the automobile other than the door 14, the clamping means 13 thereof is particularly adapted to clamp onto the flange portion 16 of the automobile door, as shown in full lines in Fig. 1. The dotted line showing 17, however, of the mirror device 11 in Fig. 1, illustrates the attachment of the mirror device to the intermediate stationary guide 18 of a now commonly used type of automobile door window in which the forward section 19 is pivotally mounted and in which the rear section 20 is mounted to be moved upwardly and downwardly.

Now of particular importances the clamping means 13 of the mirror device 11 forming the subject matter of the present invention includes a U-shaped clamping member 21 having an inner flange 22 and an opposed outer flange 23 joined by a connecting section 24. The inner flange 22 provides a fixed clamping jaw 25.

Associated with the outer flange 23 and extending outwardly therefrom is a support 26 on which is mounted the mirror 12. Preferably this support 26 has an outer section 27 and an inner section 28 with the mirror secured to the outer section and having a pivotal connection 29 between the inner and outer sections.

As shown, the outer section 27 is extensible and formed of two telescopically associated members 30 and 31, the member 31 being tubular and having a pinched portion 32 at one end thereof. At the other end of the member 31 a threaded portion 33 is provided to receive a clamping nut 34 with a tapered bore. Longitudinal slots 35 in the threaded portion 33 permit the member 31 to be drawn in and firmly clamped to the associated member 30 when the nut 34 is tightened. In this manner, by merely tightening and untightening the clamping nut 34 the slidable member 30 and associated mirror 13 may be moved inwardly and outwardly, and may be locked in any desired position. Likewise, the mirror 12 may be rotated on the longitudinal axis of the support by merely turning the member 30 in the tubular member 31.

For associating the mirror 12 with the member 30 of the extensible section 27 a substantially universal pivotal connection 36 is preferably utilized. Of importance it is to be noted that the connection 36 is located eccentrically at the rear of the mirror thus making it possible, as shown in Fig. 2, to adjust the mirror to divers positions relative to the support and thus cover a wider field of vision than would otherwise be possible.

A particularly advantageous universal connection 36 is shown in detail in the form illustrated in Fig. 4 and is achieved by providing an outwardly extending bulb portion 37 on the mirror casing 38, adapted to fit in a mating socket 39 in a head 40 on the outer end of the support. A yielding retaining washer 41 positioned on the inside of the bulb portion 37 and connected to the head 40 by a screw 42 serves to maintain the mirror 12 and head 40 in universal relation. As shown, the peripheral portion 43 of the washer 41 is angularly disposed relative to the main portion 44 of the washer 41 and is formed with radial slots 45 to facilitate the rocking and rotating movement between the head 40 and the bulb portion 37 of the mirror casing 38.

The inner section 28 of the support 26, as shown, includes a cap portion 46 having a threaded bore 47 in a base section 48 thereof adapted to receive a threaded portion 49 on the upper end of a pin 50 which extends through an enlarged threaded opening 51 in the outer flange 23 of the U-shaped clamping member 21.

A bifurcated portion 52 on the cap 46 provides a pair of upstanding ears 53 and 54 having respectively a bore 55 and a threaded bore 56 for the receipt of a screw 29' which serves as the pivot connection 29 between the inner section 28 of the support and the pinched portion 32 on the outer section 27 of the support.

Of special importance, and as shown, it is to be noted that suitably secured to the inner end of the pin 50 of the inner section of the support, and located between the opposed inner and outer flanges 22 and 23 of the U-shaped clamping member 21 is a disk 57 constituting a movable jaw 58 for cooperation with the fixed jaw 25 of the U-shaped clamping member. A pad 59 of rubber, or the like, may be advantageously positioned in a socket 60 in the gripping face of the movable jaw to prevent disfigurement of the automobile door and to achieve a more secure clamping engagement therewith.

For positively urging the movable jaw 58 toward the fixed jaw 25 of the clamping means 13 there is provided a sleeve member 61 freely rotatable on the pin 50 of the inner section 28 of the support, and having formed on the exterior thereof screw threads 62 for operative engagement with mating threads formed in the outer flange of the U-shaped member and defining the enlarged threaded opening 51 therein. A plate 64 may, as shown, be advantageously secured to the outer flange 23 of the U-shaped member to strengthen the same and to provide an additional coextensive threaded opening 65 to receive the threaded sleeve 61.

With this construction, when it is desired to urge the movable jaw 58 toward the fixed jaw 25 so as to clamp a door flange 16 therebetween, it is merely necessary to engage the preferably multisided gripping head portion 66 of the sleeve 61 with a suitable tool, such as a wrench, and rotate the same to cause the threaded sleeve member 61 to move inwardly and engage the outer face 67 of the movable jaw 58. In this manner the movable jaw together with the entire support 26 is pushed toward the fixed jaw and the mirror device 11 thus firmly attached to the door flange.

It is to be particularly noted that because the threaded sleeve member 61 is freely rotatable on the support 26 it is possible to securely clamp the mirror device onto the vehicle door flange without the necessity of turning the support in any way. Hence, with the clamping means provided by the present invention there is no possibility of the mirror being in an inoperative forward facing position when the mirror device is finally and firmly clamped to the automobile door.

When the mirror device is thus firmly fixed in position on the door it is possible, by adjustment of the extensible outer section 27, by moving the mirror 12 relative to the support 26 on the universal pivotal connection 36, and by moving the outer section 27 relative to the inner section 28 on the pivot connection 29, to achieve a very wide range of adjustment of the mirror so that the same may be used most efficiently to view divers portions of the road.

The modified mirror device 68, shown in Fig. 4, provides a support 69 for the mirror 12 in the form of an offset arm 70, instead of the pivotally associated and extensible support 26 disclosed in Figs. 2 and 3. As in the form first described, however, the mirror is preferably connected to the support 69 by a universal pivotal connection 36 including a head 40 suitably secured to the outer end of the support 69 and provided with a socket 39 to receive a bulb portion 37 located eccentrically on the rear of the mirror casing 38.

The clamping means 13, as in the form illustrated in Figs. 2 and 3, includes the U-shaped clamping member 21 having inner and outer opposed flanges 22 and 23 joined by a connecting section 24, and with the inner flange 22 providing the fixed clamping jaw 25. In associating the offset supporting arm 70 with the U-shaped clamping member 21, the inner portion 71

71 of the supporting arm 70 is extended through the enlarged threaded opening 51 in the outer flange 23 and through the coextensive threaded opening 65 in the reinforcing plate 64 secured to the outer flange.

The disk 64, suitably fixed to the inner end of the support 70 to be located between the opposed flanges 22 and 23, provides the movable jaw 58 for the clamping means. Preferably, and as in the form shown in Figs. 2 and 3, a pad 59 of rubber or the like, is associated with the gripping face of the movable jaw 58 to prevent marring of the finish of the door and to improve the gripping characteristics of the clamping means.

For urging the movable jaw 58 toward the fixed jaw 25, the same advantageous threaded sleeve member 61 disclosed in Figs. 2 and 3, is mounted on the inner portion 71 of the support 69 to operatively engage in screw threaded relationship with the threaded and coextensive openings 51 and 65 in the outer flange 23 and reinforcing plate 64 of the U-shaped member 21.

When this modified mirror device 68 is to be attached to a vehicle door, as to the forward flange 16 of the automobile door shown, it is merely necessary, as in the form first described, to place the U-shaped member so that the door flange 16 is located between the fixed and movable jaws 25 and 58. Then by rotating the head 66 of the threaded sleeve 61 the inner end thereof is caused to engage the disk 57 and thus positively urge the padded movable jaw 58 toward the fixed jaw 25 to clamp the door flange therebetween. Should it be desired to adjust the position of the mirror to bring the same more properly within the line of vision of a given vehicle operator, the mirror 12 may be moved on the universal pivot 36 and, also, the offset support 69 may be rotated to raise or lower the mirror by backing up the threaded sleeve 61 slightly so as to permit a turning movement between the movable jaw 58 and the door flange 16.

In order to provide a more finished appearance and to substantially enclose the clamping means 13 of either of the forms described, the outer flange 23 of the U-shaped member 21 which is generally triangular in shape with the base thereof joined to the connecting section 24, may be formed, as shown in Fig. 5, with a flange 72 extending inwardly to overlie the inner portion of the support and the movable jaw 58. It will be appreciated that, as shown, this enclosing flange 72 must be terminated short of the fixed jaw 25 to permit the locating of the door flange 16 or other element to be clamped in the clamping means.

With all of the forms of the invention it is to be particularly noted that because of the rotatable association of the supporting arm with the clamping member through the sleeve member 61, it is possible to readily adjust the mirror device to divers angular positions. Thus, whether the door flange 16 to which the device is to be attached is substantially vertical or at a substantial angle relative to the vertical, it is possible by turning the supporting arm to set the mirror in a plane where it may be properly viewed by the operator of the vehicle.

Moreover, because of this angular adjustment of the supporting arm relative to the clamping member it is possible to set the mirror device at divers angular positions on the vehicle so that the mirror may be properly viewed by either a tall or a short operator, and this without the necessity of shifting the clamping means upwardly or downwardly on the door, which might adversely mark the same.

If desired, and as shown in detail in Fig. 6, there may be provided in each of the forms heretofore described, a novel connection 74 between the pin 50 and the disk 57 constituting the movable jaw 58 for preventing disadvantageous relative turning movement therebetween. In achieving this connection 74 the pin 50 is formed with a shoulder 75 from which extends an end portion 76 of reduced size adapted to enter a central hole 77 in the disk 57 and receive a shakeproof or lock washer 78 positioned in a central recess in disk. The washer 78 includes a plurality of radially extending internal fingers 80 twisted or otherwise formed to be disposed at an angle to the plane of the washer.

With this construction, when the reduced end 76, preferably having a central hole 81 therein, is peened or spun down to overlie and engage the washer 78, the disk 57 and pin 50 are thus securely locked together against relative turning movement. Hence, after the device 11 has been clamped in place there is no danger of the mirror 12 inadvertently turning from its set position due to a turning of the support relative to the movable jaw.

Variations and modifications may be made within the scope of this invention and portions of the improvements may be used without others.

Having thus described the invention, what is claimed as new is:

1. In a device of the character described, the combination of a support for a mirror or the like, having inner and outer pivotally connected sections; a U-shaped clamping member having a fixed clamping jaw; a cooperable movable clamping jaw on said inner section having a socket in the gripping face thereof; a pad of cushioning material in said socket and projecting therefrom; and a sleeve freely rotatable on said inner section and having a threaded connection with said U-shaped clamping member, directly cooperable with said movable jaw for positively urging the latter and said support toward said fixed clamping jaw.

2. In a device of the character described, the combination of a support for a mirror or the like; a U-shaped clamping member having a fixed jaw; a movable jaw on said support and confined in said U-shaped member, cooperable with said fixed jaw; and a sleeve freely rotatable on said support and having a threaded connection with said U-shaped member for positively urging said support and said movable jaw toward said fixed jaw.

3. In a device of the character described, the combination of a U-shaped clamping member having inner and outer opposed flanges joined by a connecting section, said inner flange providing a fixed clamping jaw; a support for a mirror or the like, having an inner portion extending through said outer flange, said inner portion being movable longitudinally in said outer flange and freely rotatable relative thereto; a movable jaw fixed to the inner end of said inwardly extending portion and located between said opposed flanges; and screw means having threaded engagement with said outer flange, for positively urging said movable jaw and said support toward said fixed jaw.

4. In a device of the character described, the combination of a U-shaped clamping member having inner and outer opposed flanges joined by a connecting section, said inner flange providing a fixed clamping jaw; a support for a mirror or the like, having an inner portion extending through said outer flange, said inner portion being movable longitudinally in said outer flange and freely rotatable relative thereto; a movable jaw fixed to the inner end of said inwardly extending portion and located between said opposed flanges; an inwardly extending flange on said outer flange, overlying said connecting section and adapted to substantially enclose said movable jaw; and screw means having threaded engagement with said outer flange, for positively urging said movable jaw and said support toward said fixed jaw.

BENJAMIN PUTTERMAN.
DANIEL E. REED.